(12) United States Patent
Nagel et al.

(10) Patent No.: US 9,188,039 B2
(45) Date of Patent: Nov. 17, 2015

(54) DEVICE FOR EXHAUST-GAS TREATMENT NEAR AN ENGINE AND MOTOR VEHICLE HAVING THE DEVICE

(71) Applicants: Emitec Gesellschaft fuer Emissionstechnologie mbH, Lohmar (DE); J. Eberspaecher GmbH & Co. KG, Esslingen (DE)

(72) Inventors: Thomas Nagel, Engelskirchen (DE); Carsten Kruse, Troisdorf (DE); Joerg-Uwe Mueller, Filderstadt (DE); Jan Haenisch, Esslingen (DE); Joerg Oesterle, Laichingen (DE); Sebastian Leicht, Bisingen (DE)

(73) Assignees: EMITEC Gesellschaft fuer Emissionstechnologie mbH, Lohmar (DE); J. Eberspaecher GmbH & Co. KG, Esslingen (DE)

( * ) Notice: Subject to any disclaimer, the term of this patent is extended or adjusted under 35 U.S.C. 154(b) by 12 days.

(21) Appl. No.: 13/751,576

(22) Filed: Jan. 28, 2013

(65) Prior Publication Data
US 2013/0139505 A1   Jun. 6, 2013

Related U.S. Application Data

(63) Continuation of application No. PCT/EP2011/062488, filed on Jul. 20, 2011.

(30) Foreign Application Priority Data

Jul. 28, 2010   (DE) .......................... 10 2010 032 576

(51) Int. Cl.
| | |
|---|---|
| *F01N 3/00* | (2006.01) |
| *F01N 3/10* | (2006.01) |
| *F01N 3/28* | (2006.01) |
| *F01N 3/02* | (2006.01) |
| *F01N 3/023* | (2006.01) |
| *F01N 3/04* | (2006.01) |
| *F01N 3/20* | (2006.01) |

(52) U.S. Cl.
CPC ................ *F01N 3/10* (2013.01); *F01N 3/2892* (2013.01); *F01N 3/02* (2013.01); *F01N 3/0231* (2013.01);
(Continued)

(58) Field of Classification Search
CPC ..... F01N 3/106; F01N 3/2033; F01N 3/2066; F01N 3/10; F01N 3/2982; F01N 3/02; F01N 3/2892; F01N 3/0231; F01N 3/103; F01N 3/2885; F01N 3/009; F01N 3/017; F01N 2240/02; F01N 2240/25
USPC ......... 60/605.1, 272, 275–324, 274; 422/170, 422/172, 182
See application file for complete search history.

(56) References Cited

U.S. PATENT DOCUMENTS 7,490,467 B2 * 2/2009 Cummings ..................... 60/324
8,327,634 B2   12/2012 Orihashi et al.
(Continued)

FOREIGN PATENT DOCUMENTS

DE   20 2007 007 910 U1   8/2007
EP   1 333 908 A1   8/2003
(Continued)

OTHER PUBLICATIONS

International Search Report of PCT/EP2011/062488.

*Primary Examiner* — Thomas Denion
*Assistant Examiner* — Kelsey Stanek
(74) *Attorney, Agent, or Firm* — Laurence A. Greenberg; Werner H. Stemer; Ralph E. Locher

(57) ABSTRACT

A device for exhaust-gas treatment near an engine includes an annular structure and a guide structure disposed in an exhaust line. An inner wall forms an inner flow passage and an outer flow passage in the annular structure. The inner wall and the guide structure form a gap in such a way that only a limited secondary flow of the exhaust gas is conducted through the inner flow passage. A motor vehicle having the device is also provided.

15 Claims, 3 Drawing Sheets

(52) U.S. Cl.
CPC . *F01N 3/04* (2013.01); *F01N 3/103* (2013.01); *F01N 3/2066* (2013.01); *F01N 2240/20* (2013.01); *F01N 2240/40* (2013.01); *F01N 2250/02* (2013.01); *F01N 2470/08* (2013.01); *F01N 2470/24* (2013.01); *F01N 2610/02* (2013.01)

(56) References Cited

U.S. PATENT DOCUMENTS

| | | |
|---|---|---|
| 8,336,302 B2 | 12/2012 | Nakahira |
| 2008/0271442 A1* | 11/2008 | Baumgartner .................. 60/302 |
| 2009/0151339 A1* | 6/2009 | Doring ............................ 60/295 |
| 2010/0212292 A1* | 8/2010 | Rusch et al. .................... 60/274 |
| 2011/0061374 A1* | 3/2011 | Noritake ......................... 60/286 |
| 2014/0072490 A1* | 3/2014 | Dotzel et al. .................. 423/212 |

FOREIGN PATENT DOCUMENTS

| | | |
|---|---|---|
| EP | 2 119 881 A2 | 11/2009 |
| WO | 02/32552 A1 | 4/2002 |
| WO | 2008/068632 A2 | 6/2008 |
| WO | 2010/082308 A1 | 7/2010 |
| WO | WO 2010082308 A1 * | 7/2010 |

* cited by examiner

DEVICE FOR EXHAUST-GAS TREATMENT NEAR AN ENGINE AND MOTOR VEHICLE HAVING THE DEVICE

CROSS-REFERENCE TO RELATED APPLICATION

This is a continuation, under 35 U.S.C. §120, of copending International Application No. PCT/EP2011/062488, filed Jul. 20, 2011, which designated the United States; this application also claims the priority, under 35 U.S.C. §119, of German Patent Application DE 10 2010 032 576.7, filed Jul. 28, 2010; the prior applications are herewith incorporated by reference in their entirety.

BACKGROUND OF THE INVENTION

Field of the Invention

The present invention relates to a device disposed near or close-coupled to an engine for exhaust-gas treatment, in which it is sought, in particular, to specify a system for selective catalytic reduction (SCR) in which the exhaust gas is treated with an additive, particularly a liquid reducing agent.

It is known to treat exhaust gases of diesel engines with regard to nitrogen oxide emissions. For that purpose, the exhaust gas is, for example, treated with ammonia and/or urea (reducing agent) in order to reduce the nitrogen oxides contained in the exhaust gas, in such a way that the nitrogen oxides are converted into nitrogen and oxygen. For that purpose, firstly, ammonia or urea is dispersed in the exhaust-gas flow and the mixture is conducted through a corresponding catalytic converter. The so-called SCR catalytic converter promotes the reduction of nitrogen oxides. Since, specifically in mobile applications, it is preferable for an additive which ultimately releases ammonia, a so-called reducing agent precursor, to be carried on board, a prior chemical conversion of the reducing agent precursor (urea) into the reducing agent (ammonia) may be necessary. That may take place purely thermally by virtue of the ammonia being heated to above a certain threshold temperature (thermolysis). It is, however, also possible for that purpose to use catalytic converters which promote the so-called hydrolysis of urea. In that case, preferably liquid urea is firstly conducted across a hydrolysis catalytic converter, so that ammonia is formed which is then conducted together with the exhaust gas to the SCR catalytic converter.

It must furthermore be taken into consideration in that case that the exhaust gas has further pollutant constituents, in particular hydrocarbons and/or carbon monoxide, which should likewise be catalytically converted. For that purpose, use is made in particular of so-called oxidation catalytic converters (or so-called DOCS).

The exhaust gas often also contains particles which should likewise be removed from the exhaust-gas flow. Corresponding filters, particle separators, etc. may be provided for that purpose.

Specifically in the case of diesel engines it must be taken into consideration that the exhaust gas is at a relatively low temperature. The above-mentioned catalytic reactions, however, first take place above a certain threshold temperature, the so-called light-off temperature of the respective catalytic converter. It is therefore desirable for the catalytically promoted reactions to take place at as close-coupled a position or near to the engine as possible, because the exhaust gas passing from the engine is still at a relatively high temperature there. That, however, necessitates the provision of particularly space-saving devices which can be at least partially integrated into the engine compartment of a motor vehicle. In that case, there is also the problem, in particular, that it is sought to purify the exhaust gas of the above-mentioned pollutants and/or particles as completely as possible over a very short flow path.

SUMMARY OF THE INVENTION

It is accordingly an object of the invention to provide a device for exhaust-gas treatment near an engine and a motor vehicle having the device, which overcome the hereinafore-mentioned disadvantages and at least partially solve the highlighted technical problems of the heretofore-known devices and motor vehicles of this general type. It is sought, in particular, to specify a device which permits exhaust-gas treatment near an engine in a small installation space. Furthermore, it is also sought to ensure that, in the exhaust-gas flow, a conversion of the additive into a reducing agent for the exhaust gas, in particular for the conversion of a urea-water solution into ammonia, is attained as quickly as possible (in a small space), so that rapid mixing of the ammonia with the exhaust gas can take place thereafter.

With the foregoing and other objects in view there is provided, in accordance with the invention, a device for exhaust-gas treatment near an engine. The device comprises an annular structure and a guide structure in an exhaust line. In this case, an inner flow passage and an outer flow passage are formed through the use of an inner wall in the annular structure. The inner wall and the guide structure form a gap so that only a limited secondary flow of the exhaust gas is conducted through the inner flow passage.

The device relates, in particular, to a module of an exhaust line. The module can, for example, be connected through the use of flanges to adjacent parts of the engine and/or of the exhaust-gas treatment system. In this case, the exhaust line has, in particular, a profile with multiple windings in order to permit a close-coupled or near-engine configuration under the restricted spatial conditions in the engine compartment of a motor vehicle.

In this case, the exhaust line has at least one annular structure. The annular structure has an inner wall which forms an inner flow passage and an outer flow passage for the exhaust gas flowing through. It is preferable in this case for the inner flow passage to be of approximately cylindrical form and for the outer flow passage to be formed in the manner of a concentric ring around the outside of the inner flow passage. In this respect, the inner wall itself preferably forms a substantially cylindrical tube which extends over a desired region in the flow direction of the exhaust gas. The annular structure therefore very particularly preferably has a cylindrical outer wall and a cylindrical inner wall, which are disposed concentrically with respect to one another and are fixed to one another in this position. If the exhaust gas now flows to such an annular structure, a part of the exhaust gas is conducted through the outer flow passage and a part of the exhaust gas is conducted through the inner flow passage. The determination as to what fraction flows through the inner flow passage and what fraction flows through the outer flow passage is conventionally dependent on the flow profile of the incoming exhaust-gas flow and/or on the specific inflow direction of the exhaust gas. Specifically for the situation in which the flow approaches the annular structure obliquely, it must be ensured that a uniform inflow, or an inflow to the inner flow passage and to the outer flow passage in the desired fractions, is nevertheless attained.

For this purpose, there is provided in this case a guide structure for the exhaust gas, which guide structure interacts with the inner wall of the annular structure in such a way that both together form a gap which permits only a limited secondary flow of the exhaust gas through the inner flow passage. In this respect, the guide structure is, in particular, not connected to the annular structure but rather to the exhaust line and/or to further components of the device. Specifically through the provision of a predefined gap dimension, it is made possible for only a very small fraction of the exhaust gas to enter into the inner flow passage, but nevertheless adequate space for the treatment of the inflowing exhaust gas is created there. A type of throttle is thus formed in the inlet region of the inner flow passage. With the precise setting of a primary flow through the outer flow passage and the small, limited secondary flow through the inner flow passage, it is possible to attain targeted simultaneous treatment of the exhaust-gas flow in the parallel flow passages.

In accordance with another feature of the invention, it is particularly preferable in this case for the gap to be formed in the manner of an annular gap concentrically with respect to the inner wall. In other words, this means in particular that the annular gap is formed radially at the inside adjacent the inner wall and has substantially a uniform gap dimension in the circumferential direction.

In accordance with a further feature of the invention, it is furthermore preferable for the guide structure to be formed in the manner of a sleeve and to be disposed in such a way that the inner wall and the sleeve radially partially overlap. It is very particularly preferable for the guide structure or sleeve to protrude partially into the inner wall of the annular structure or for the guide structure to extend into the inner flow passage of the inner wall. It is thus possible, specifically in the case of a cylindrical construction of the inner wall and a cylindrical construction of the sleeve, for an annular gap to be formed between the inner wall and the sleeve, which annular gap extends from an end side of the inner wall over a predefined region into the inner flow passage.

It is basically preferable for the guide structure and the inner wall to together form an annular gap which is likewise of substantially cylindrical construction. It is also very particularly preferable for the inner wall to protrude beyond an end surface of the annular structure and for the guide structure to extend into the projecting part of the inner wall, in such a way that a type of labyrinth (meandering flow path) is formed for the inflowing exhaust gas. The gap in the labyrinth can be set in such a way that only a very limited secondary flow of the exhaust gas flows through it and reaches the inner flow passage.

In accordance with an added feature of the invention, in one refinement of the device, it is proposed that an additive discharger is provided which can add an additive into the inner flow passage. The additive is preferably a liquid. Very particularly preferable in this case is an additive discharger which can introduce a urea-water solution into the inner flow passage. It is particularly preferable in this case for the additive discharger to extend through the exhaust line and to be surrounded by the guide structure. It is thus possible for the guide structure to be assigned, in particular, to the additive discharger directly or to a region of the exhaust line surrounding the additive discharger. It is furthermore preferable for the configuration of the additive discharger, of the guide structure and of the inner wall to be such that the metered additive is admixed only to the limited secondary flow of the exhaust gas. In this connection, the secondary flow is, in particular, selected in such a way that it provides precisely the amount required for the conversion of the additive, in such a way that precisely the desired effects with regard to thermolysis and/or hydrolysis are attained. Furthermore, the secondary flow is, if appropriate, also dimensioned in such a way that, through the use of the gap, a boundary flow is formed at the inner side of the inner wall, in such a way that predominant wetting of the inner wall with the additive is reduced. Furthermore, the formation of a desired spray mist and/or mixing of the additive with the secondary flow can also be promoted through the construction of the gap. In order to clarify, it is pointed out herein that an additive is to be understood, in particular, to mean a reducing agent and/or a reducing agent precursor.

In accordance with an additional feature of the invention, it is also proposed that at least the inner flow passage or the outer flow passage has a catalytic converter. It is very particularly preferable for both the inner flow passage and also the outer flow passage to have in each case at least one catalytic converter. With regard to the outer flow passage, through which the predominant fraction of the exhaust gas flows, it is preferable for an oxidation catalytic converter to be provided. The oxidation catalytic converter is formed, in particular, in the manner of a honeycomb structure. It is very particularly preferable in this case for the honeycomb structure to be formed with metallic foils, because these quickly absorb the temperature of the exhaust gas, and therefore the oxidation catalytic converter quickly reaches its light-off temperature. With regard to the inner flow passage, it is preferable for a hydrolysis catalytic converter to be provided there. In view of the fact that the secondary flow is very small, the hydrolysis catalytic converter can also be formed with a small volume. For this purpose, it is proposed that the hydrolysis catalytic converter be formed only in a rear region of the inner flow passage, that is to say in particular is considerably shorter than the oxidation catalytic converter provided at the outside. The hydrolysis catalytic converter, too, is preferably formed in the manner of a honeycomb body, in particular with metallic foils. The hydrolysis catalytic converter may additionally have a mixing structure so as to further promote mixing of the additive with the exhaust gas within the hydrolysis catalytic converter. Accordingly, through the use of the inner flow passage, there is formed in the flow direction firstly a gap, then a region in which the additive can mix with the secondary flow, and finally a hydrolysis catalytic converter. It is furthermore preferable for the catalytic converters to together form a substantially planar outflow surface for the exhaust gas in its entirety.

In accordance with yet another feature of the invention, a mixing portion for the exhaust gas is formed downstream of the annular structure in the flow direction of the exhaust gas, and the inner wall of the annular structure projects into the mixing portion and itself has a mixer structure. The mixing portion has, in particular, the function of mixing the primary flow of the exhaust gas with the secondary flow of the exhaust gas, in such a way that, in particular, the additive (in this case, in particular, ammonia) is distributed as uniformly as possible throughout the exhaust-gas flow. Such a mixing portion of the exhaust line may be realized, for example, through the use of a cross-sectional variation of the exhaust line, wherein the exhaust line may itself also have diverting structures, fins or the like in order to promote the mixing of the partial exhaust-gas flows. It is furthermore proposed herein that the inner wall of the annular structure extends beyond the rear side of the catalytic converters into the mixing portion of the exhaust line. On and/or in the mixer wall there are now provided one or more mixer structures which divert the secondary flow outward from the inner flow passage and/or divert the primary flow from the outside into the inner flow passage. For this purpose, such a mixer structure may have guide blades, holes, flow turbulence generating devices and the like. It is preferable in this case for the inner wall to be formed in one piece. This is, however, not imperatively necessary.

In accordance with yet a further feature of the invention, a catalytically active additive reactor is provided downstream of the annular structure in the flow direction of the exhaust gas. Metered additive can react with the exhaust gas in the additive reactor. The catalytically active additive reactor is very particularly preferably a so-called SCR catalytic converter which reacts with the ammonia now present in the exhaust gas and with the exhaust gas, in such a way that nitrogen oxides contained in the exhaust gas are reduced. It is very particularly preferable in this case for the additive (ammonia) to have previously been distributed uniformly in the exhaust gas in the mixing portion and for a substantially uniform mixture to then be supplied through the exhaust-gas flow to the additive reactor. The additive reactor, too, is preferably formed in the manner of a honeycomb body, in particular with metallic foils. The corresponding catalytically active substance is formed, for example, as a coating on the metallic foils.

In accordance with yet an added feature of the invention, it is also very particularly preferable for the additive reactor to additionally be formed in the manner of a particle separator. It is basically possible in this case for the particle separator to be a so-called wall-flow filter with alternately closed-off ducts. It is preferable, however, to provide a so-called open particle separator system in which none of the ducts or channels of the honeycomb structure is completely closed off. Instead, provided in the ducts are diverting structures, flow constrictions, openings, etc. which promote a repeated passage of partial amounts of exhaust gas through a filter material (fiber mat, etc.). With such an open particle separator system, it is possible for the pressure loss for the exhaust gas as it flows through the additive reactor to be kept low. Furthermore, it is possible in this case for a regeneration of the soot particles to be attained through the use of continuous regeneration (CRT process), because nitrogen dioxide is already generated upstream of and/or in the SCR catalytic converter. The nitrogen dioxide effects such a conversion of the soot particles even at relatively low temperatures.

The device is very particularly preferably used in motor vehicles, in particular passenger motor vehicles.

With the objects of the invention in view, there is concomitantly provided a motor vehicle, comprising an engine, a turbocharger and a device according to the invention, wherein the exhaust gas being produced flows through the turbocharger and subsequently through the device according to the invention. The engine is, in particular, an internal combustion engine operated with an excess of air, in particular a diesel engine. It is very particularly preferable for the device to be connected directly downstream of a turbocharger.

Other features which are considered as characteristic for the invention are set forth in the appended claims, noting that the features listed individually in the claims can be combined with one another in any desired technologically expedient manner and highlight further embodiments of the invention.

Although the invention is illustrated and described herein as embodied in a device for exhaust-gas treatment near an engine and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
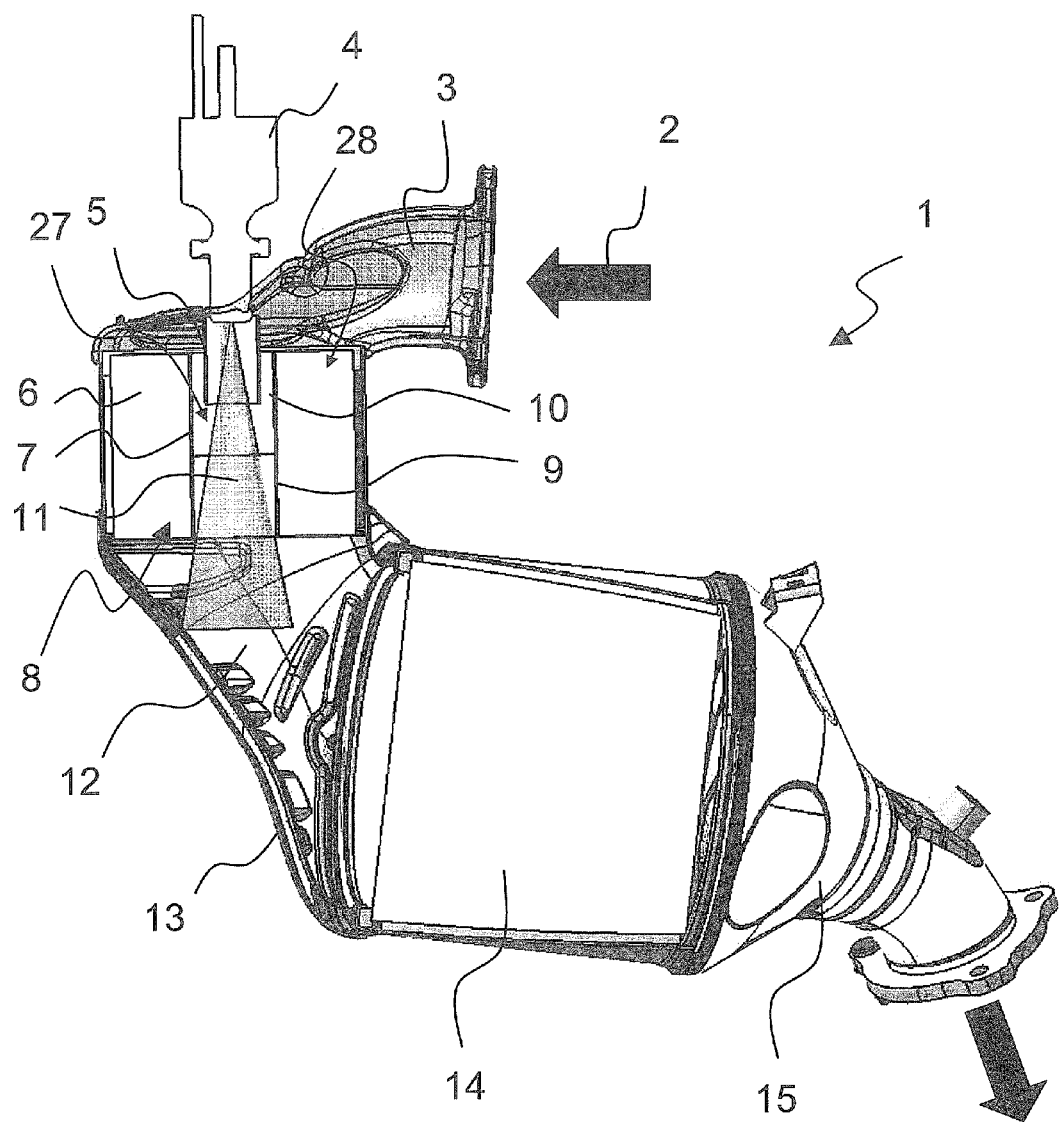
FIG. 1 is a diagrammatic, partly-sectional, perspective view of a first exemplary embodiment of a device according to the invention.

Referring now to the figures of the drawings in detail and first, particularly, to FIG. 1 thereof, there is seen a sectional model of a device 1 according to the invention. In this case, the flow direction 2 of the exhaust gas through the device 1 is indicated by arrows. Accordingly, the exhaust gas flows firstly in an inflow portion 3 of an exhaust line 13, is then conducted through an annular structure 8, then reaches a mixing portion 12 and is subsequently conducted through an additive reactor 14 before the exhaust gas exits the device 1 again through an outflow portion 15.

It can also be seen from this illustration that the exhaust gas impinges obliquely on the annular structure 8 through the inflow portion 3. The annular structure 8 centrally forms a cylindrical inner wall 7 which divides the annular structure 8 into an inner flow passage 27 and an outer flow passage 28. A first catalytic converter 6, in particular an oxidation catalytic converter which is formed in the manner of a honeycomb body and which serves for converting hydrocarbons and carbon monoxide and if appropriate for forming nitrogen dioxide, is disposed in the outer flow passage 28. A second (relatively small) catalytic converter 9 is provided in the inner flow passage 27, at the rear side. The second catalytic converter 9 is preferably formed as a honeycomb body with a hydrolysis function (hydrolysis coating).

Only a limited secondary flow of the exhaust gas flows through the inner flow passage 27. This is achieved through the use of a gap 10 which is formed between the inner wall 7 and a guide structure 5. In the structural variant shown herein, the inner wall 7 does not protrude beyond the end surfaces of the annular structure 8. The guide structure 5 is provided on an end surface of the annular structure 8 which is impinged upon by the exhaust gas and is constructed in the manner of a sleeve which extends into the inner wall 7. In the illustrated configuration, the guide structure is joined to an additive discharger 4, in such a way that contact between a primary flow of the exhaust gas and an additive 11 in the inflow portion 3 is avoided.

In one advantageous refinement, in order to also reduce the fraction of carbon monoxide and/or hydrocarbons, for example, in the secondary flow, a further non-illustrated oxidation catalytic converter is provided upstream of the annular structure 8 and the guide structure 5. The concentration of undesired substances in the exhaust gas, in particular the concentration of hydrocarbons and/or carbon monoxide, can be reduced through the use of the further oxidation catalytic converter. The further oxidation catalytic converter is preferably provided upstream of a turbocharger.

The additive 11 is introduced at desired times and/or in predefined doses into the inner flow passage 27 by the additive discharger 4, is mixed with the secondary flow and is conducted together therewith across the second catalytic converter 9, wherein the desired ammonia is then formed from the reducing agent precursor (urea-water solution). The components of the exhaust-gas flow that undergo different treatment in parallel (primary flow and secondary flow) are merged again downstream of the annular structure 8, specifically in the so-called mixing portion 12. The exhaust line 13 has different elevations in the mixing portion 12 in order to promote the mixing of the two partial exhaust-gas flows. Another flow diversion toward the transversely disposed additive reactor 14 is also generated in this case. The additive reactor 14 is preferably formed in the manner of a honeycomb body which has an SCR coating. The additive reactor 14 may furthermore simultaneously be formed as a particle trap. The process of selective catalytic reduction for the reduction of nitrogen oxides is predominantly also performed in the additive reactor, aside from the particle conversion. The purified exhaust gas then exits the additive reactor 14 through the outflow portion 15 of the exhaust line 13. The outflow portion has a conical construction in this case. Merely for the sake of completeness, it is mentioned that the device 1 may additionally have further components, in particular sensors and further catalytic converters, etc.

Figure 2:
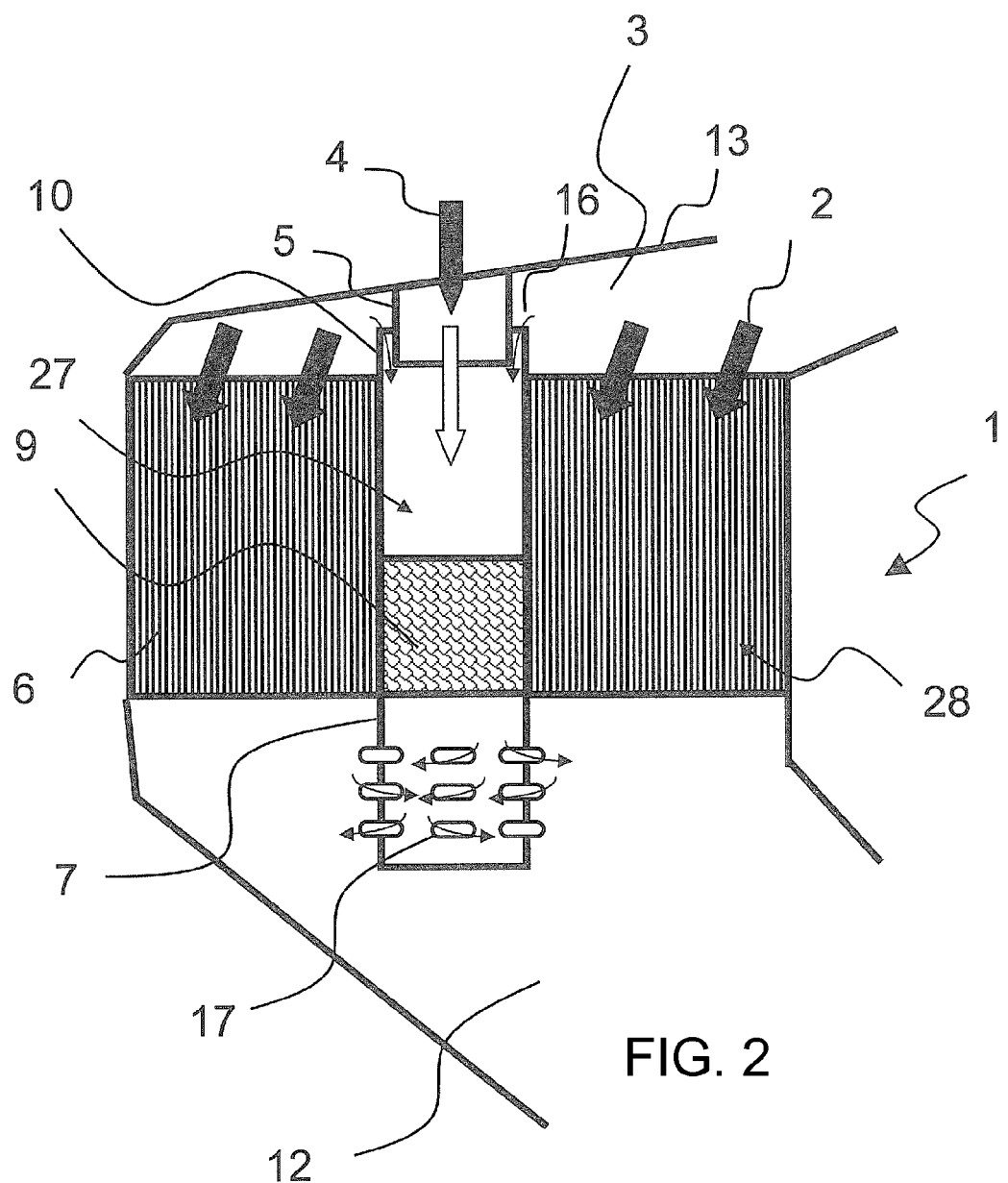
FIG. 2 is a fragmentary, enlarged, longitudinal-sectional view of a second structural variant of the device according to the invention.

A slightly different structural variant, in particular with regard to the configuration of the inner wall 7, is illustrated in FIG. 2. In the variant shown therein, the inner wall 7 is formed as a cylindrical tube which, however, protrudes toward both sides of the annular structure. At one side, the inner wall 7 projects into the inflow portion 3 and, at the other side, the inner wall 7 projects into the mixing portion 12. In the region of the inflow portion 3, the exhaust line 13 has a sleeve-like guide structure 5 which projects there into the protruding partial region of the inner wall 7. The guide structure 5 and the inner wall 7 thus partially overlap radially, in such a way that a concentric annular gap 10 is formed. The gap 10 is dimensioned in such a way that only a very limited secondary flow 16 flows into the inner flow passage 27, in particular because a type of labyrinth is formed in this case. The additive discharger 4, with which the additive, in particular a urea-water solution, can be metered, is again provided in the region of the exhaust line 13 within the guide structure 5.

As already indicated by the thick arrows, a predominant fraction of the exhaust gas flows externally across the first catalytic converter 6. It is therefore important to attain good mixing between the primary flow and the secondary flow 16 again downstream. For this purpose, the inner wall 7 projects into the mixing portion 12 and itself has a mixer structure 17 through which the primary flow is partly delivered into the inner flow passage and/or the secondary flow 16 is diverted out of the inner flow passage 27 radially toward the primary flow. This permits intensive mixing of the two exhaust-gas flows in a very short mixing portion of the exhaust line 13.

Figure 3:
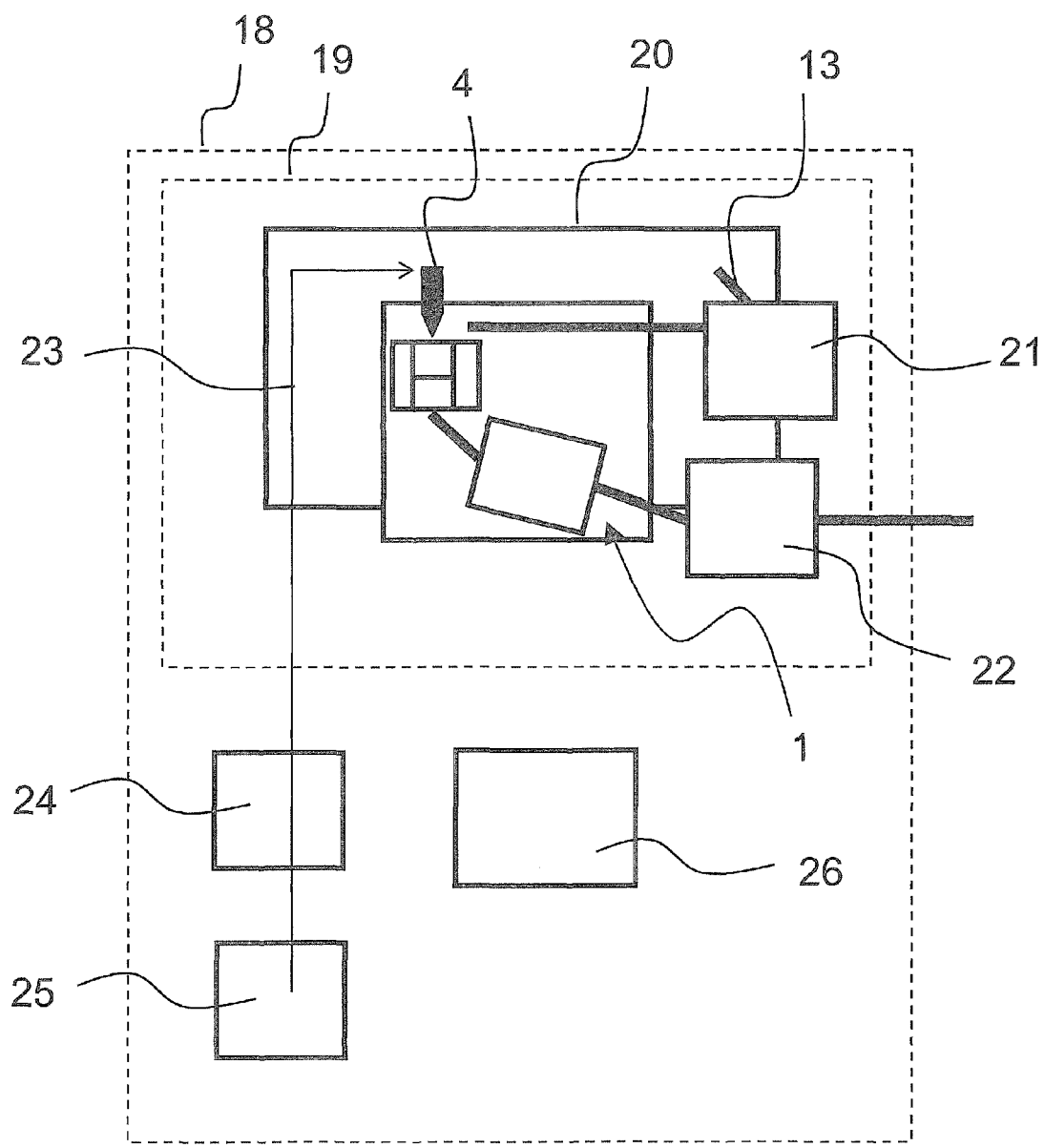
FIG. 3 is a block diagram showing an overview of an integration of the device according to the invention into a motor vehicle.

FIG. 3 is intended to illustrate a possible integration of the device 1 according to the invention into a motor vehicle 18. FIG. 3 also indicates, in particular, an engine compartment 19 of the motor vehicle 18 in which an engine 20, in particular a diesel engine, is provided. The exhaust gas produced in the engine 20 firstly flows through the exhaust line 13 into a turbocharger 21, before the exhaust gas reaches the device 1 according to the invention. In this case, the additive is preferably stored in an additive tank 25 and delivered to the additive discharger 4 through an additive line 23 as required by an additive conveyor 24. This process can be regulated, in particular, by a control unit 26. The control unit generally takes into consideration characteristic values of the engine 20 and/or from sensors of the exhaust system. The exhaust gas which finally exits the device 1 may, for example, be supplied to even further catalytic converters or exhaust-gas treatment units. In this respect, a third catalytic converter 22 which may, in particular, be an oxidation catalytic converter, is indicated in this case by way of example. The finally purified exhaust gas is then discharged into the atmosphere.

The invention claimed is:

1. A device for exhaust-gas treatment near an engine, the device comprising:
    an exhaust line conducting exhaust gas from the engine in a flow direction;
    a single inflow portion receiving an entire exhaust gas flow from the engine through said exhaust line, an annular structure and a sleeve-shaped guide structure disposed in said exhaust line;
    an inner wall forming an inner flow passage with an inlet region and an outer flow passage in said annular structure;
    said inflow portion causing the exhaust gas to impinge obliquely on said annular structure;
    said guide structure being separate from and extending into said inner flow passage formed by said inner wall;
    said inner wall and said guide structure defining a gap therebetween forming a throttle in said inlet region of said inner flow passage configured to limit a secondary flow of the exhaust gas conducted through said inner flow passage;
    an additive discharger configured to meter a urea-water solution additive into said inner flow passage and to admix the metered additive only to said secondary flow of the exhaust gas;
    a mixing region following said gap in said flow direction and configured to mix the additive with said secondary flow; and
    a hydrolysis catalytic converter disposed in said inner flow passage and following said mixing region in said flow direction.

2. The device according to claim 1, wherein said gap is an annular gap formed concentrically to said inner wall.

3. The device according to claim 1, wherein said inner wall and said sleeve partially overlap radially.

4. The device according to claim 1, wherein said outer flow passage has another catalytic converter.

5. The device according to claim 1, which further comprises:
    an exhaust gas mixing portion disposed downstream of said annular structure in the exhaust gas flow direction;
    said inner wall of said annular structure projecting into said mixing portion; and
    said inner wall having a mixer structure.

6. The device according to claim 1, which further comprises a catalytically active additive reactor disposed downstream of said annular structure in the exhaust gas flow direction, said additive reactor configured to allow metered additive to react with the exhaust gas in said additive reactor.

7. The device according to claim 6, wherein said additive reactor is also a particle separator.

8. A motor vehicle, comprising:
    an engine producing exhaust gas;
    a turbocharger through which the exhaust gas flows downstream of said engine; and
    a device according to claim 1 through which the exhaust gas flows downstream of said turbocharger.

9. The motor vehicle according to claim 8, wherein said device is disposed directly downstream of said turbocharger.

10. The device according to claim 1, wherein said throttle in said inlet region of said inner flow passage is a labyrinth.

11. The device according to claim 1, wherein said guide structure is connected to said exhaust line and is not connected to said annular structure.

12. The device according to claim 1, which further comprises flanges connecting the device to adjacent parts of the engine to permit a close-coupled or near-engine configuration under restricted spatial conditions in an engine compartment of a motor vehicle.

13. The device according to claim 1, wherein said additive discharger extends through said exhaust line and is surrounded by said guide structure.

14. The device according to claim 1, wherein said guide structure is joined to said additive discharger.

15. The device according to claim 1, wherein said inner wall has an inner side, and said gap dimensions said secondary flow to form a boundary flow at said inner side of said inner wall reducing predominant wetting of said inner wall with the additive.

* * * * *